Sept. 11, 1945.  A. M. YOUNG  2,384,516
AIRCRAFT
Filed Nov. 10, 1941  5 Sheets-Sheet 1

Inventor
ARTHUR MIDDLETON YOUNG

By
Beau, Brooks, Buckley & Beau Attorneys

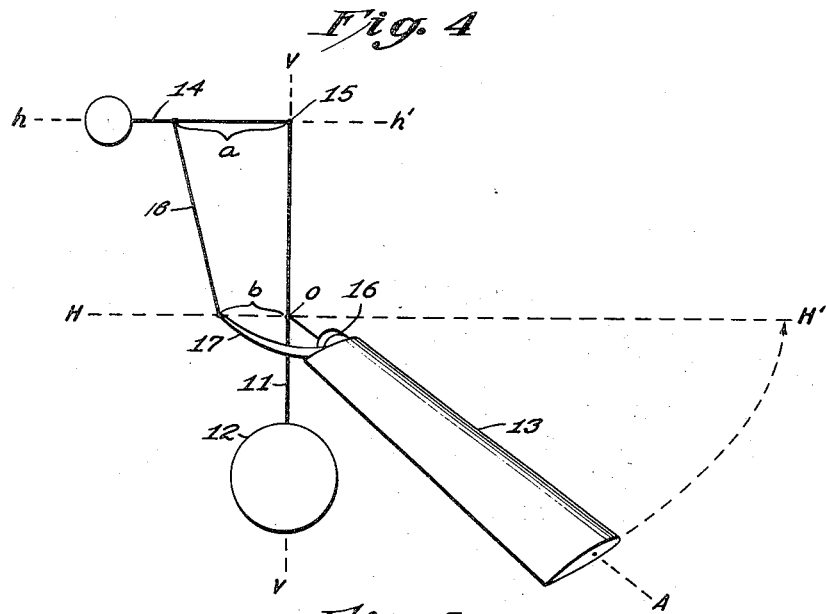
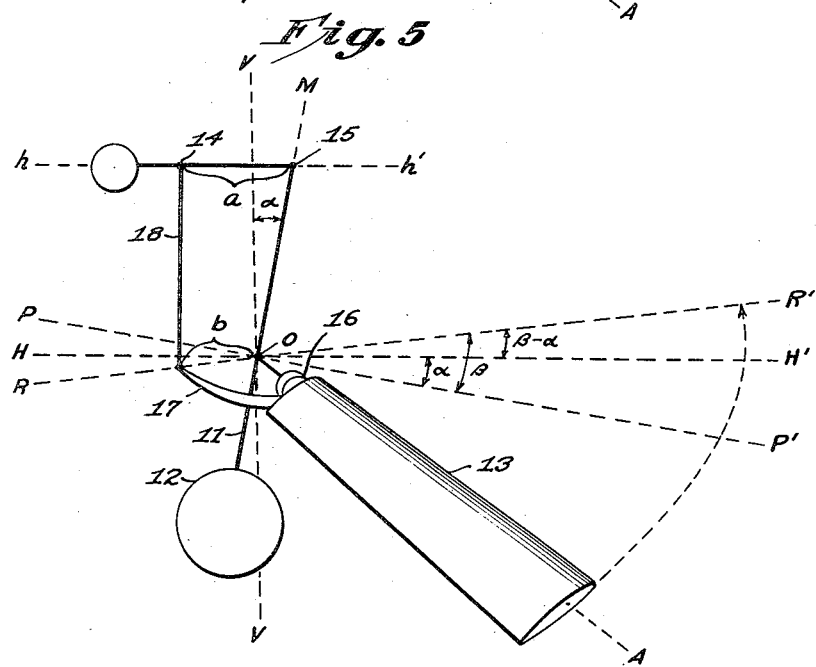

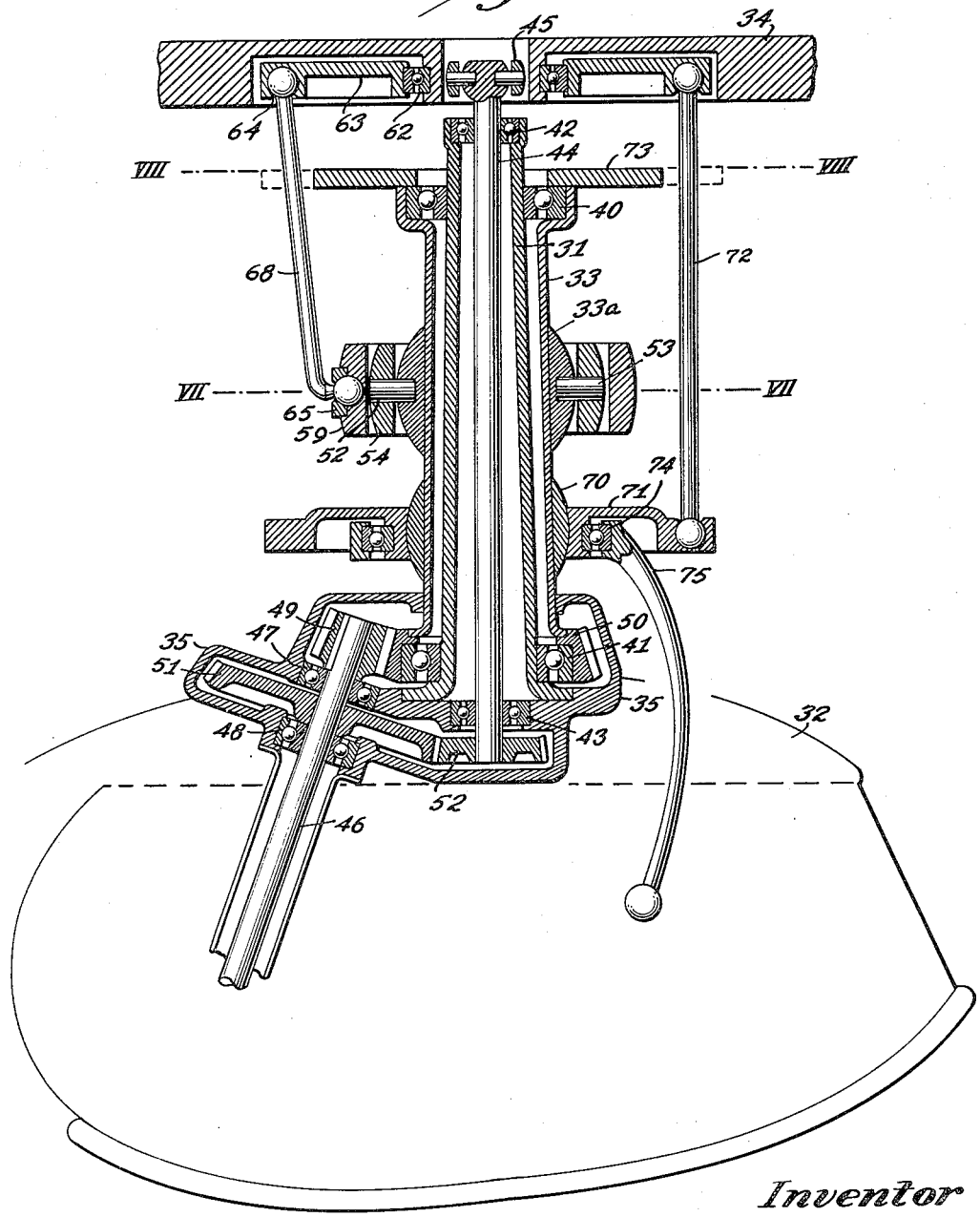

Sept. 11, 1945.  A. M. YOUNG  2,384,516
AIRCRAFT
Filed Nov. 10, 1941  5 Sheets-Sheet 4

Inventor
ARTHUR MIDDLETON YOUNG

By
Beau, Brooks, Buckley & Beau. Attorneys

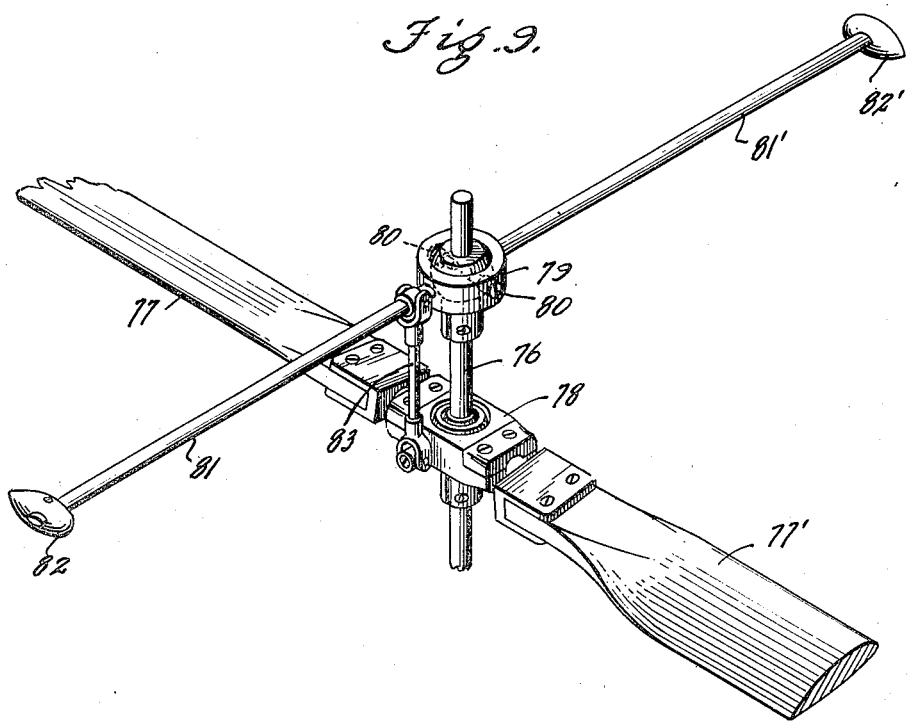

Patented Sept. 11, 1945

2,384,516

UNITED STATES PATENT OFFICE 2,384,516

AIRCRAFT

Arthur Middleton Young, Paoli, Pa., assignor to Bell Aircraft Corporation, Buffalo, N. Y., a corporation of New York Application November 10, 1941, Serial No. 418,619

26 Claims. (Cl. 244—17)

This invention relates to bodies or vehicles with rotative thrust producing devices which bodies or vehicles are adapted for movement in a fluid medium and more particularly to bodies with thrust producing devices comprising rotating foils which react upon the medium to control the movement of the body or vehicle in the medium.

Heretofore bodies of this type have in general employed a thrust producing device in the form of a propeller or lift screw in conjunction with separate surfaces to control the position or motion of the body. These separate or auxiliary surfaces depend for their effectiveness upon the motion of the body through the medium as for example in airplanes and certain types of helicopters. In devices of the foregoing type when the body or vehicle is subjected to inclination either accidental or otherwise an equal and corresponding inclination of the auxiliary control surfaces, measured with the respect to an independent axis, such as the horizon, is produced which nullifies their net controlling effect. When the net controlling effect of the auxiliary surfaces is nullified, the body or vehicle becomes unstable and this instability instead of being corrected by the control surfaces, increases in magnitude periodically until the body or vehicle upsets.

Accordingly, this invention contemplates the combination whereby the thrust producing means or a portion thereof is modified so as to function as a control means with the result that the control and thrust producing functions are effected by a single means. The invention consists essentially of a control means for a body operating in a fluid medium and includes rotating blades or foils. Since the rotating blades or foils are kept in rotation during the operation of the body, the control is independent of the forward motion of the body. The control means further includes an inertia element which functions as a base from which or with respect to which control is obtained. The result of this combination is to produce a self-controlling device which resists accidental or externally imposed tipping of the body or vehicle.

This application is a continuation-in-part of applicant's copending case Serial No. 329,867, filed April 16, 1940.

In order to further illustrate the deficiencies of previous devices, the operation and flight characteristics of a helicopter, an aircraft which is sustained in air by a rotor blowing the air downwardly, will be considered. The blades of the rotor are above the center of gravity of the craft and the downward flow of air encounters the rotor blades before it passes the center of gravity of the craft tending to force the blades around to the lee side of the center of gravity. In this respect it is similar to a dart thrown tail first upwardly. The incident air would strike the feathers which may be considered the equivalent of the helicopter rotor blades and force them around to the lee side of the center of gravity of the dart. This produces a tendency to invert the craft which is not completed immediately, for as soon as the machine inclines it starts to move horizontally in the direction of inclination, and this movement, by increasing the lift of the advancing blade due to the greater velocity with which it meets the air, causes the advancing blade to rise as it goes around and climb into a high position as it gets ahead of the machine, in effect tipping the rotor back. The backwardly tipped rotor causes the forward motion to stop, but the inertia of the fuselage carries it on and the net result is a swinging motion, followed in turn by another swinging motion in the opposite direction. This swinging, unchecked, will grow in amplitude until, after swinging several times, the motion becomes so severe as to cause the machine to upset. In a rigid blade helicopter the upsetting tendency is compounded with gyroscopic forces due to the inertia of the rotor resulting in precession and conical movement of the mast upon which the rigid blades are mounted. These combined motions likewise become more pronounced until finally the craft upsets. These observations may be made with free flying models not controlled by a pilot, but even in a machine controlled by a pilot, the nature of the instability is such as to make it almost impossible to maintain a fixed position in space, constant vigilance at the control only resulting in a continual teetering in flight.

This instability is typical of bodies that support themselves by means of thrust producing devices above or ahead of the center of gravity. An airplane has a similar behavior when the lift surfaces are ahead of the center of gravity. In this case it will get into unstable oscillation which may increase in magnitude. In this case the propeller is a part of the lift surface and its presence ahead of the center of gravity has to be balanced by an equivalent tail surface to preserve stability.

It is, therefore, the principal object of this invention to provide a means to obtain positive stability of bodies having rotating thrust producing devices which bodies are adapted for movement in a fluid medium under all conditions of movement of the body in that medium.

Another object of this invention is to provide a thrust producing means for a body adapted for movement in a fluid medium which is modified so as to function as a stabilizing control means.

Still another object of this invention is to provide a means for stabilizing a body adapted for movement in a fluid medium including rotating blades or foils and an inertia element as a base from which or with respect to which control is obtained.

A further object of this invention is to provide a stabilizing means which shall not prevent or interfere with the operator's ability to control and maneuver the machine in flight. In the airplane it happens that stability is only obtained at a sacrifice of maneuverability because the natural tendency of the machine to keep itself on an even keel opposes the efforts of the pilot to change its position. In the present invention the stability is attained by a device that automatically maintains the machine in a given position, but the choice of this position is at the discretion of the operator.

A still further object is to provide a helicopter which shall be relatively immune to the influence of gusts or sudden changes in the horizontal wind velocity. The present invention, in consequence of the stability which it affords results in a tendency of the rotor to "dig in" to a sudden gust where an ordinarily rotor would tip back and move with the gust.

Briefly, this invention comprises a lifting rotor in which the blades are inclinable about axes extending longitudinally in the blade, a control for changing the inclination of the blades, an inclinable rotating inertia means associated with said rotor and controls, and a linkage which interrelates the inclination of the inertia means, the blades, and the control. In operation the inertia means maintains itself relatively non-inclined in space as the fuselage undergoes changes in position, and the resulting angular displacement of the mast with respect to the plane of rotation of the inertia means is used to feather the blades of the rotor in such a way as to cause the rotor to remain uninclined or to tip in the opposite direction to the mast, thereby causing a restoring couple.

Referring to the drawings in which the invention herein is shown as applied to a helicopter having a hinged rotor, Figure 1 is a diagrammatic view of a helicopter of the hinged rotor type incorporating the invention herein and shown in flight with the mast vertical.

Figure 4 is a diagram illustrating the elements of the invention in the position they would take when the mast was vertical.

Figure 5 is a diagram showing the elements of Figure 4 in the position they would take when the mast was tipped due to a disturbing influence.

Figure 6 is a vertical cross section to an enlarged scale of the mast and hub of a machine such as is shown in Figure 1.

Figure 9 is a fragmental view in perspective of a modified form of the invention.

Figure 1:
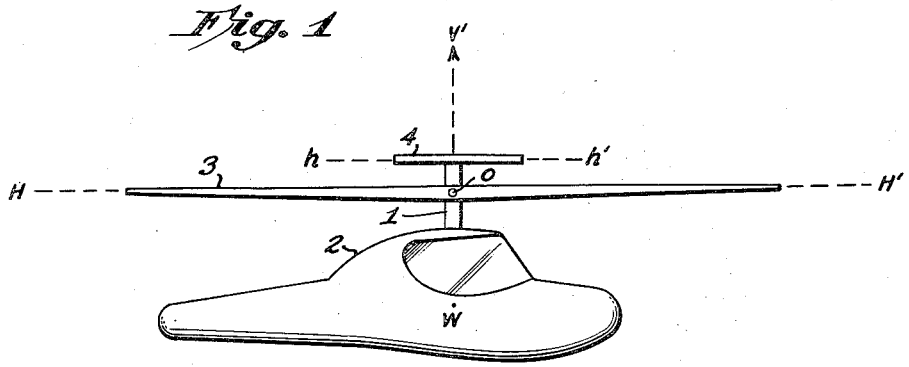

Referring to the drawings in detail, Figure 1 discloses a schematic diagram of a helicopter of the hinged rotor type having a mast 1, mounted on a fuselage 2. A rotor 3, mounted on the mast 1 rotates in a plane normally perpendicular to the mast. A flywheel 4, is mounted on the mast 1 above the rotor 3 and rotates with the rotor at the same or greater speed. The flywheel 4 is articulated in its connection to the mast 1, in such a manner as to permit it to incline with respect to the mast while rotating. Means interconnecting the flywheel and the rotor blades will be hereinafter described in detail but are omitted in Figures 1, 2, and 3. In the arrangement disclosed in Figure 1, the mast is shown in a vertical position as indicated by the dotted line O—V'. The rotor 3 is shown rotating in a generally horizontal plane H—H', and the flywheel 4 rotating in a horizontal plane h—h'. As long as the fuselage 2, and with it the mast 1, is not displaced, the rotor 3 and the flywheel 4 continue to rotate in mutually parallel horizontal planes and both remain perpendicular to the mast.

Figure 2:
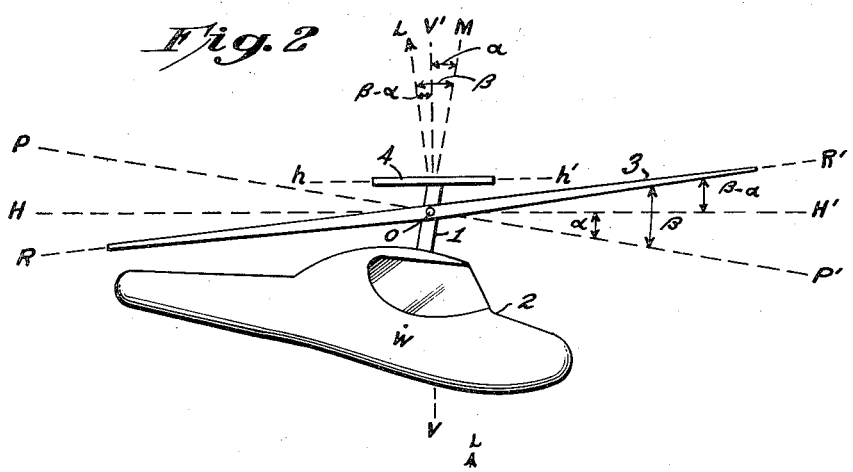
Figure 2 is the same as Figure 1 with the mast shown tipped forward due to a disturbing influence.

The diagrammatic showing in Figure 2 represents the condition immediately following those shown in Figure 1 when the mast, due to any cause whatever, has undergone a displacement with respect to the vertical V—V', and now lies along a line O—M, at an angle $\alpha$ with its old position. The flywheel 4, due to its inertia and its articulated connection to the mast, maintains its plane of rotation relatively unchanged with respect to space, which is depicted in Figure 2 as the plane h—h', still horizontal, as in Figure 1. The rotor, for reasons as will be hereafter apparent, has tipped back from perpendicularity with the mast into the plane indicated by the line R—R'. The line P—P' perpendicular to the mast, has become displaced with respect to the horizontal H—H' by the same angle $\alpha$ that the mast was displaced from the vertical. Let $\beta$ be the angle between R—R' and P—P', we see that if $\beta$ is greater than $\alpha$ the line R—R' will be tipped back from the horizontal H—H' by an angle $\beta-\alpha$. Since the lift vector of a rotor is perpendicular to the rotor plane the lift vector, represented by O—L, will be tipped back from the vertical by the angle $\beta-\alpha$ and since this lift vector acts at the rotor center, which is above the center of gravity, indicated by the point W in the figures, the backwardly tipped rotor will apply a couple to the mast and fuselage such as to pull the mast back into a perpendicular position.

Figure 3:
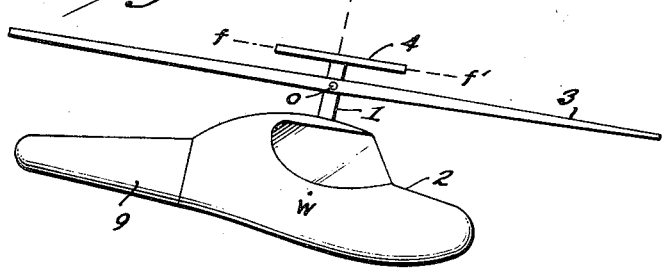
Figure 3 is the same as Figures 1 and 2 but with the mast tipped by the operator for forward flight.

In Figure 3 there appears a diagrammatic representation of the conditions which obtain in forward flight. By means that will be described in what follows, the pilot changes the plane of rotation of the flywheel into a forwardly inclined plane f—f'. In the same way that the forwardly inclined mast of Figure 2 was urged back into perpendicularity with the horizontal flywheel of that figure, the now inclined flywheel will urge the mast into perpendicularity with itself, and the rotor into parallelism with itself, so that the whole combination will be inclined with respect to the vertical at the angle given the flywheel by the pilot.

As a result of this inclination, the lift vector will be tipped forward, and produce a horizontal component which will provide forward acceleration. As forward motion develops the rotor will tip back, due to unequal lift on advancing and retreating blades, until the machine no longer gains speed but continues at a uniform velocity.

When the machine is moving forward at its maximum velocity the flywheel will be tipped forward more than the mast but it will still exert its stabilizing influence and oppose changes of speed or direction. To steer the machine the pilot inclines the flywheel to right or left, either by changing the orientation of the machine with a rudder 9 (Figure 3) in the slipstream of the rotor, or by changing the direction of the flywheel's inclination with respect to the machine.

The combination of parts which are employed in this invention to produce the results described above will be considered now and it will be shown how they operate to cause the rotor to oppose unwanted tipping of the mast, and yet permit the operator to cause desired tipping of the mast for control.

In Figure 4 there appears a diagrammatic showing in perspective of a mast 11 mounted on a body 12. A blade 13 is mounted to rotate around the mast 11 in a plane AOH' perpendicular to the mast, and a weighted arm 14 is hinged to the mast above the blade at 15 to move up and down in a plane containing the mast but not containing the blade 13. A journal 16 permits the blade 13 to incline about an axis passing longitudinally through it. Secured to the blade is a bracket 17 which provides a means for inclining the blade about this longitudinally extending axis. This bracket 17 extends part way round the mast to come under the hinged arm 14, to which it is connected by a rod 18. The rod 18 is hingedly attached to the arm 14 at a distance ($a$) from the mast 11, and hingedly attached to the bracket 17 at a distance ($b$) from the mast 11. As will appear in what follows the ratio $a/b$ is an important relationship of the invention.

The ratio of the distance of the upper end of the rod 18 from the mast and the distance of its lower end from the mast, i. e. the ratio $a/b$, determines what may conveniently be termed the stability factor. In the drawings this ratio is shown somewhat greater than is necessary in practice, in fact the ratio may be 1 or less than 1 and operate satisfactorily. A value of 1 would give neutral stability while values greater than 1 give positive stability. The essential nature of this method of control is that with the flywheel controlling the rotor, small displacements of either the machine or the rotor are not accompanied by changes in the control of the rotor; there is, as it were, no fed back. Experiments with the stability of helicopters have shown that the source of instability of machines of this type as ordinarily constructed is the fact that the rotor tends to follow small displacements of the mast so leading to an amplification of the causes that initiated the displacement. By controlling the rotor through the flywheel the rotor is made independent of displacements of the mast, or in the case where the stability factor exceeds 1 is made to positively oppose displacements of the mast, but in any case there is no cumulative effect. The rod 18 is of such a length as will permit the blade 13 to take its average lifting angle when the arm 14 is perpendicular to the mast. As represented in Figure 4 the mast 11 has a vertical position and the blade 13 is moving around it in the horizontal plane AOH'. The lift vector will, therefore, be vertical and exactly balance the force of gravity. In order not to unduly encumber the diagrams, only one blade is shown and is intended to represent any number that may be used.

Figure 5 shows the mast 11 of Figure 4 displaced at an angle with the vertical, the vertical as before, being represented by the line VOV', and the mast direction by the line O—M. Since the arm 14 is free to move up and down in its hinge 15, due to its inertia, it will remain in the same plane $h$—$h'$ that it was in before the mast tipped. The bracket 17 by virtue of the rod 18 will be forced down and the blade 13 inclined with respect to the mast. Were the distance ($a$) equal to the distance ($b$) the bracket 17 would be held at rest relative to space when the mast inclined. With ($a$) greater than ($b$), the condition shown, the blade is inclined in the opposite sense to the inclination of the mast. The illustration shows the device as constructed for maximum effectiveness, i. e. ($a$) greater than ($b$), but it is not necessarily desirable to have maximum effectiveness for the reason that this interferes with the pilot's control of the machine and "slows" the control.

Calling $\beta$ the angle through which the blade is inclined relative to the mast, and recalling that $\alpha$ was the angle through which the mast was displaced, it will be seen that the angle through which the blade is inclined relative to space is measured by $\beta-\alpha$. If $a=b$, then $\alpha=\beta$ and angle $\beta-\alpha$ is zero.

The path described by the blade as it rotates is for a hinged blade determined by its angle of attack with respect to the air it meets. It has been seen that this angle has been changed by the linkage so in consequence the path tracked will be changed, and will in fact incline upward by just the same amount that the blade angle has changed. Other things being equal the plane tracked by the blade will be inclined in space relative to its former position by this same angle, $\beta-\alpha$ the sense of inclination being of course opposite to that of the mast. Hence it will be seen how a mechanism can be devised to cause the rotor to tip in the opposite direction to the mast and hence maintain the latter vertical.

In the above the blade 13 was described as though hinged, but the case when the blade is not hinged, but is part of a rigid or semi-rigid rotor, is in effect the same. In this case the blade is not free to track in a new plane, but due to its inclination it tries to ge into this inclined plane and in so doing exerts the restoring force on the mast in the form of a couple at the blade root. Experimental work to date has indicated preference for the two degrees of freedom supplied by the universal joint. However, the "see saw" motion, or ability of the propeller to rock about an axis perpendicular to the blades is not essential to the operation, it being sufficient to provide a rotation about an axis extending longitudinally in the blades.

Referring again to the drawings, Figure 6 shows a more complete structural embodiment of the invention herein. A hollow mast, 31, supports a rotating sleeve 33 which carries a hub inner part 33$a$, on two main bearings 40 and 41. The mast 31 is rigidly secured to the upper part of the fuselage 32. Inside the mast on bearings 42 and 43 is a shaft 44, on whose upper end a universal joint 45, supports a flywheel 34. A shaft 46, is attached to a source of power, not shown, in the fuselage and is supported in a case 35, integral with the mast 31 by bearings 47 and 48. The shaft 46 carries a driving pinion 49, meshing with a gear 50, on the rotating hub inner part 33$a$. The shaft 46 also carries a gear 51, which engages a pinion 52 on the shaft 44. Thus the rotation of the shaft 46 causes the rotation of both hub inner part 33 and flywheel 34, the latter at a higher rate of speed.

Figure 7:
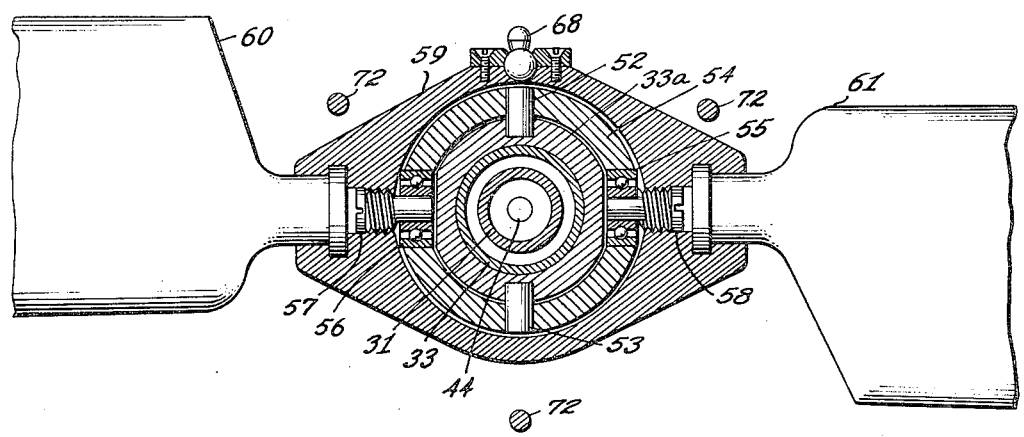
Figure 7 is a horizontal sectional view of the hub taken along the line VII—VII of Figure 5.

The hub inner part or rotary member 33a carries pins 52 and 53, which in turn support an intermediate ring or first joint member 54. Referring particularly to Figure 7, ring 54 carries ball type anti-friction bearings 55 and 56 which are in a plane at right angles to pins 52 and 53. The bearings 55 and 56 carry other pins 57 and 58 attached to the hub outer part, or second joint member 59.

In Figure 7 this hub outer part or second joint member 59 carries blades 60 and 61, which may be supported in journals as described in copending application Serial Number 289,719 for pitch change, but said journals are omitted from the present application for purposes of simplification.

The flywheel 34 (Figure 6) carries coplanar with the pins of the universal joint, a ball bearing 62, whose outer race carries a control plate 63. A connecting rod 68 (identical in function with rod 18 of Figures 4 and 5) interconnects plate 63 and hub outer part 59, being attached to plate 63 by the ball joint 64 and to hub outer part 59 by lower ball joint 65.

Figure 8:
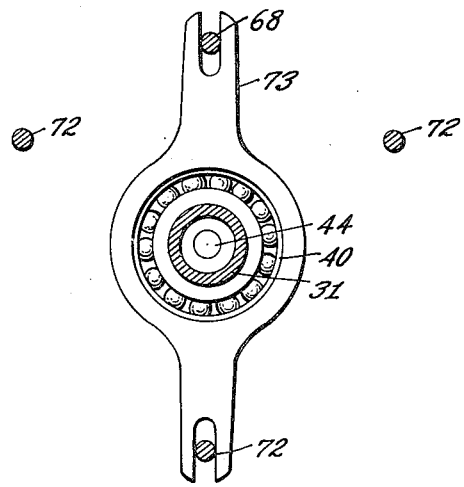
Figure 8 is a horizontal sectional view along the line VIII—VIII of Figure 5.

In operation, the rotor comprising the blades 60 and 61, and the hub parts 33, 33a, 54 and 59, is rotated by the driving pinion 49 and gear 50, about a substantially vertical axis. In step with this rotation, control plate 63 also revolves. To insure the rotation of the control plate 63, a slotted plate 73, which is more clearly visible in Figure 8 is attached to the sleeve 33. At the same time, the gear 51 drives the pinion 52 and hence the shaft 44 and the flywheel 34 at its upper end. In the embodiment shown, shaft 44 and flywheel 34 rotate at considerably higher speed than the rotor.

As a universal joint, when the driven member is inclined with respect to the driver, drives with a slightly non-uniform motion, it is advisable to have the shaft 44 somewhat flexible or else to provide a spring drive somewhere between shaft 46 and universal joint 45. The same applies to the universal joint of the rotor.

Besides the rotation of the above parts about an approximately vertical axis there is also their inclination about a horizontal axis. Because of the pins 57 and 58 in Figure 7 the hub outer part 59 can be rocked about the mast by the rod 68, about an axis coinciding with the longitudinal axes of the blades. The flywheel 34 is also able to tip while rotating, and to impart its inclination through the control plate, 63, and the rod 68, to the hub outer part 59, so feathering the blades. With the mast as axis of reference the hub 59 turns more than the flywheel 34. With the flywheel as axis of reference tipping the mast will cause tipping of the hub outer part 59 in an opposite direction, which as we have seen above causes a couple which rights the mast.

Referring now to the control of the machine, beneath the hub on a spherical seat 70, there is a lower control plate 71. This plate is linked by rods 72, which may be three or four in number, to the upper control plate 63. As rods 72 are of equal length and attached with upper and lower ends equidistant from the mast center, they serve to maintain the upper and lower control plates parallel. Other means such as the slotted plate 73 serve to keep the plates rotating together. Integral with lower control plate 71 is the inner race of a ball bearing 74, to whose outer race is attached the control stick 75. Other control means can be provided, such as cables or the rods leading to suitable control levers in the fuselage, but for the purpose of this application control stick 75 suffices.

The operation of the control is simple except for the complication arising from the fact that the control stick 75 is in effect attached to the inclinable rotating flywheel, which causes the displacement, due to a force applied by the operator, to be 90° after the applied force, so that the operator must push the stick in a direction 90° before, as measured in the direction of rotation.

If it is desired that the control should be arranged so that the pilot push the stick in the direction he wants the machine to move, this may be accomplished with bell cranks or the like. However, even so the stick will not behave in the usual manner, since it will move in a direction 90° to the applied force and this movement must be allowed to take place unhindered. So that, if servomotors are used to move the stick, as for example in a large machine they must be so contrived to apply force, not movement, to the stick, since any positive restraint on the stick or flywheel eliminates its independence and interferes with its stabilizing function.

It is desirable to rotate the flywheel at a higher speed than the rotor in order that its weight may be kept down, but this is not essential to the invention, being in the nature of structural refinement. In the same way, it is desirable to reduce to a minimum the forces required to feather the blades (which forces reduce the effectiveness of the flywheel by making it less independent of the mast), but it is not essential to the invention that the two bladed rotor described in the preferred embodiment be used. Any number of blades, one, two, three, or more may be used provided care is taken to keep the feathering forces at a low value. Again it is not necessary that the flywheel be located above the rotor, it may also be placed below it, or anywhere in the fuselage provided it is linked in such manner as to cause the blades to be feathered in opposition to displacements of the mast. For example, the flywheel can be driven by a small electric motor and mounted on the stick itself, the stick connected to the blades of the rotor in such a manner that a movement of the stick through a given angle causes an angular movement of the blades, and the results will be the same as in the particular embodiment illustrated in the drawings.

A modified form of the invention is disclosed in Figure 9. A mast 76 which is mounted on a vehicle that is not shown has a rotor comprising blades 77—77' and a rotor hub indicated generally as 78. The rotor hub 78 has the same structure as the hub disclosed in Figure 7 and is therefore arranged to permit hinged movement of the blades and a rocking movement about an axis coinciding with a longitudinal axis of the blades 77—77'. A collar 79 is mounted on the mast 76 above the rotor on pins 80 and is free to hinge thereupon. An inertia means comprising a pair of bars 81—81' is mounted on the collar 79 with the longitudinal axis of the bars displaced 90° with respect to the longitudinal axis of the blades 77—77'. The displacement of the bar axis with respect to the blade axis may be varied, however. The bars 81—81' may be provided with weights 82—82', though this provision is entirely optional. A link 83 interconnects the inertia means and the rotors and controls the position of the rotor during rotation.

The function and operation of this modified form of control is the same as that of the form in Figure 7 in which a flywheel is employed. While the inertia means employed with the invention herein have been disclosed as comprising either a flywheel or a bar, other inertia means may be utilized. However, the character of the inertia means must be such that its inertial function is not materially affected by any fluid dynamic or aerodynamic reaction.

While the inertia means may be mounted anywhere in the aircraft and may have its axis at any angle with respect to the axis of the rotor within certain limits, it is difficult to define this relation without imposing unnecessary limitations on the device. There are a number of axes involved namely the axis of the mast; the axis of the rotor, which may be defined as being perpendicular to the rotor plane and which in the case of the articulated or hinged type of rotor need not coincide with the axis of the mast; the feathering axis, which may be defined as the axis with respect to which the angle of incidence of the individual blades is constant; and the axis of rotation of the rotating inertia means. All of these axes may incline with respect to the vertical and with respect to each other due to either a horizontal wind, the inclination of the body itself, the activities of the pilot or for other reasons. Furthermore, the axis of the inertia means may even be offset from the others. Consequently, to define any one of these axes as being parallel is erroneous, though they all point generally in the same direction, i. e. within about 20° of one another. In view of the foregoing it is apparent that the only restriction which may be placed upon the relation between the axis of the inertia means and the remaining axes is that its direction is such that it lies more in the direction of the axis of the mast than in any direction perpendicular thereto. This relation may be expressed mathematically as the axis of rotation of the inertia means having a greater component in the direction of the axis of the body than in any direction perpendicular thereto. Where this expression appears herein, it will be understood that the term, the axis of the body refers to the axis of the mast or the rotor support. This is a convenient axis of reference because it is not effected by the controls or the wind but only by the inclination of the body or craft itself.

It is to be understood that other modifications, arrangements of parts, and constructions of details may be made from those described without departing from the scope of the invention.

References to any methods or apparatus for torque correction, and other essential requisites of helicopters have been omitted as having no bearing on the operation of the device herein described. For instance, no method of making simultaneous change of pitch of the blades is shown, but since only slight modifications are necessary to adapt the pitch change mechanism described in copending application Serial Number 289,719 to the present invention, it has been omitted.

I claim:

1. In an aircraft, a frame, a bearing mounted on said frame, a rotating airscrew comprising a hub and a plurality of blades, means mounting said hub upon said bearing for rotation, means mounting said blades on said hub, means for varying the blade effective incidences during rotation, a rotating inertia means mounted on said fuselage for universal inclination of its plane of rotation with respect to said fuselage, the axis of rotation of the inertia means being directed generally in the direction of the axis of rotation of said hub, and means interconnecting said rotating inertia means and said blade incidence varying means, said interconnecting means being operably responsive to the inclination of the plane of rotation of said inertia means with respect to said fuselage to vary the effective incidence of said blades cyclically during rotation.

2. In an aircraft as set forth in claim 1, the combination including means to vary the inclination of the rotating inertia means with respect to the fuselage to maneuver the aircraft.

3. In an aircraft, a fuselage, a pair of rotating shafts co-axially mounted on said fuselage, an airscrew comprising a hub and a plurality of blades mounted on one of said shafts, means mounting said blades on said hub for rotation about the axes of the blades for variation of their incidence during rotation, a flywheel mounted on the other of said shafts for universal inclination of its plane of rotation with respect to said fuselage, and means responsive to the inclination of said flywheel operably connected with said blades whereby the inclination of the plane of rotation of said flywheel with respect to said fuselage governs the incidence of said blades during rotation and causes the plane of rotation of the rotor to tend to follow inclinations of the plane of rotation of the flywheel.

4. In an aircraft, a body, a rotating support mounted on said body, an airscrew comprising a hub and a pair of opposed radially extending blades, a universal joint for mounting said airscrew on said rotating support to permit said airscrew to rock about a longitudinally extending axis of said blades for feathering and about a transverse axis for inclination of the plane of rotation of said blades, a rotating inertia means mounted upon said body and rotating about an axis generally parallel but inclinable to the axis of rotation of said airscrew, means interconnecting said rotating inertia means and said airscrew, said interconnecting means being operably responsive to the inclination of the plane of rotation of said rotating inertia means to vary the incidence of the blades to cause the plane of rotation of the blades to tend to follow inclinations of the plane of rotation of the inertia means.

5. In an aircraft, a fuselage, a pair of rotating shafts coaxially mounted on said fuselage, an airscrew comprising a hub and a pair of opposed radially extending blades, means for mounting said hub and blades on one of said shafts for rocking movement about an axis extending generally longitudinally of said blades, an inertia means, means mounting said inertia means on the other of said shafts to permit universal inclination of its plane of rotation with respect to said fuselage, means responsive to the inclination of the plane of rotation of said inertia means operably connected to said blades whereby the inclination of the plane of rotation of said inertia means with respect to said fuselage cyclically governs the incidence of said blades during rotation and causes the plane of rotation of the airscrew to tend to follow inclination of the plane of rotation of the inertia means.

6. In a rotating wing aircraft, a fuselage, a support mounted on said fuselage, an airscrew mounted on said support, said airscrew comprising a hub and a plurality of blades freely linked to said hub to permit inclination of the plane of rotation of the airscrew relative to said support, means for mounting said blades on said hub to permit rotation of the blades about a longitudinally extending axis therein, a rotating inertia means mounted on said fuselage and rotating about an axis generally parallel but inclinable to said support, means interconnecting said rotating inertia means and said blades, said interconnecting means being operably responsive to the inclination of the plane of rotation of said inertia means with respect to said fuselage to cyclically vary the incidence of said blades and cause the plane of rotation of the airscrew to tend to follow inclinations of the plane of rotation of the inertia means.

7. In an aircraft, a body, a pair of co-axially arranged rotating shafts mounted on said body, a rotor carried by one of said shafts for rotation about the axis thereof, said rotor comprising a blade support, a blade extending generally radially of said axis, means mounting the blade on the support for rotation generally about a longitudinal axis of said blade for variation of the incidence of said blade during rotation, a flywheel, means mounting said flywheel on the other of said shafts for universal inclination of its plane of rotation with respect to said body, means responsive to the inclination of said flywheel connected with said blade whereby the inclination of the plane of rotation of the flywheel with respect to said body will govern the incidence of said blade during rotation.

8. In an aircraft, a body, a rotating shaft mounted on said body, a rotor, means mounting the rotor on said shaft, said rotor comprising a blade support, a blade extending generally radially of the axis of said shaft, means mounting the blade on the support for rotation generally about a longitudinal axis of said blade, a bar hingedly mounted on said shaft for movement generally transversely with respect to a longitudinal axis of said blade, displaceable means interconnecing said hinged bar and said blade whereby the inclination of said bar will govern the incidence of said blade during rotation of the rotor to cause the plane of rotation of the blade to tend to follow inclinations of the plane of rotation of the bar.

9. In an aircraft, a fuselage, a shaft mounted on said fuselage, an air screw including a hub mounted for rotation about the axis of said shaft, a plurality of blades extending generally radially of said hub, means mounting said blades on said hub for rotation generally about a longitudinal axis of said blades for variation of their incidence during rotation of the air screw, a rotating inertia means mounted on said fuselage for rotation about an axis generally parallel but inclinable to the axis of said shaft, and displaceable means interconnecting said rotating inertia means and said blades for transmitting movement due to inclination of the plane of rotation of said inertia means to said blades to vary the incidence of the blades during rotation of the air screw and to cause the plane of rotation of the rotor to tend to approach parallelism with the plane of rotation of the inertia means.

10. In an aircraft as set forth in claim 9, the combination including means to vary the inclination of the rotating inertia means with respect to the fuselage to maneuver the aircraft.

11. In an aircraft, a body, a rotor, means mounting the rotor on the body for rotation about a generally upright axis and for universal inclination relative thereto, said rotor comprising a blade support, a blade extending generally radially of said axis, means mounting the blade on the support for rotation generally about a longitudinal axis of said blade, a rotating inertia means mounted upon said body and rotating about an axis generally parallel but universally inclinable to the axis of rotation of said rotor, and displaceable means interconnecting said rotating inertia means and said rotor and operably responsive to universal inclinations of said rotating inertia means to vary the incidence of the blade on said rotor.

12. In an aircraft an upstanding rotary shaft, a hub, universal means for mounting said hub on the shaft, blades carried by the hub and extending in opposite directions from said hub, a second hub, means for pivotally mounting said second hub on the shaft for pivotal movement about an axis generally parallel to the longitudinal axes of said blades, inertia weight means carried by said second hub and extending laterally therefrom in a direction generally perpendicular to the pivot axis of the second hub, and motion transmitting means interconnecting said hubs for transmitting pivotal movement of the second hub to pivotal movement of the blade carrying hub whereby the latter pivots about the longitudinal axis of the blade in the same direction as the pivotal movement of the second hub.

13. In an aircraft, a body, a rotary member mounted on the body for rotation about a generally upright axis, blade means, means mounting the blade means on the rotary member for rotation about a longitudinal axis of the blade means, inertia means rotatable about an axis generally parallel to the upright axis and means mounting the inertia means on said body for universal inclination relative thereto, and means connecting the inertia means with the blade means to rock the blade means about a longitudinal axis thereof.

14. In an aircraft, a body, a rotary member mounted on the body for rotation about a generally upright axis, blade means, means mounting the blade means on the rotary member for rotation about a longitudinal axis of the blade means, inertia means mounted upon said body and rotatable about an axis generally parallel to the upright axis and inclinable thereto, means connecting the inertia means with the blade means to rock the blade means about a longitudinal axis thereof, and means for shifting the inertia means to cause it to rotate in a different plane.

15. In an aircraft, a body, a rotary member mounted on the body for rotation about a generally upright axis, blade means, means mounting the blade means on the rotary member for rotation about a longitudinal axis of the blade means, inertia means pivoted to the rotary member about an axis parallel to a longitudinal axis of the blade means, and means connecting the inertia means with the blade means to rock the blade means about a longitudinal axis thereof.

16. In an aircraft, a body, a rotary member mounted on the body for rotation about a generally upright axis, blade means, blade carrying means, means mounting the blade means on the carrying means for rotation about a longitudinal axis of the blade means, means mounting the blade carrying means on the rotary member to enable the blade means to move in a plane containing the generally upright axis and to extend generally radially of the upright axis, arm means pivoted to the rotary member about an axis parallel to a longitudinal axis of the blade means, weight means carried by the outer portion of the arm means, and means connecting the arm means with the blade means to rock the blade means about a longitudinal axis thereof.

17. A rotor for sustaining and propelling a body in a fluid comprising a rotary member mounted on the body for rotation about a generally upright axis, blade means, means mounting the blade means on the rotary member for rotation about a longitudinal axis of the blade means, inertia means rotatable about an axis generally parallel to the upright axis, means mounting the inertia means for universal inclination, and means connecting the inertia means with the blade means to rock the blade means about a longitudinal axis thereof.

18. In an aircraft, a body, a rotor, means mounting the rotor on the body for rotation about a generally upright axis and for universal inclination relative thereto, said rotor comprising a blade support, a blade extending generally radially of said axis, means mounting the blade on the support for rotation generally about a longitudinal axis of said blade, a rotating inertia means mounted upon said body and rotating about an axis generally parallel but universally inclinable to the axis of rotation of said rotor, displaceable means interconnecting said rotating inertia means and said rotor and operably responsive to universal inclinations of said rotating inertia means to vary the incidence of the blade on said rotor, and means to vary the inclination of the rotating inertia means with respect to the body to maneuver the aircraft.

19. In a rotating wing aircraft, a fuselage, a support mounted on said fuselage and a rotor blade mounted on said support to permit rotation about a first axis and incidence changes of said rotor blade by movement thereof, a rotating inertia means mounted on said fuselage and rotating about an axis generally parallel but inclinable to said first axis, means interconnecting said rotating inertia means and said blade, said interconnecting means being operably responsive to the inclination of the plane of rotation of said inertia means with respect to said fuselage to cyclically vary the effective incidence of said blade and to cause the plane of rotation of the blade to tend to follow inclinations of the plane of rotation of the inertia means.

20. In a rotating wing aircraft, a fuselage, a support mounted on said fuselage, a rotor blade, means mounting said rotor blade on said support for rotation thereof about a first axis and for incidence changes of said rotor blade, a rotating inertia means mounted on said fuselage and rotating about an axis generally parallel but inclinable to said first axis, means interconnecting said rotating inertia means and said blade, said interconnecting means being operably responsive to the inclination of the plane of rotation of said inertia means with respect to said fuselage to cyclically vary the incidence of said blade and to cause the plane of rotation of the blade to tend to follow inclinations of the plane of rotation of the inertia means.

21. A rotor device for attachment to a body for propelling the latter through a fluid medium, said rotor device comprising a support and a blade mounted upon said support for rotation about a first axis and pitch change movements about a second axis transverse to said first axis, inertia means rotatable about an axis generally parallel to said first axis, means mounting said inertia means upon said support for universal inclination of said inertia means relative to said support, and means connecting said inertia means and said blade and operably responsive to inclinations of the plane of rotation of said inertia means to vary the pitch of said blade cyclically during its rotation.

22. A rotor device comprising a support and a blade mounted upon said support for rotation about a first axis, means for changing the effective incidence of said blade, inertia means rotatable about an axis generally parallel to said first axis, means mounting said inertia means upon said support for universal inclination of said inertia means relative to said support, and means connecting said inertia means and said blade incidence changing means and operably responsive to inclinations of the plane of rotation of said inertia means to vary the effective incidence of said blade cyclically during its rotation.

23. In an aircraft, a body, a rotary member mounted on said body for rotation about an upright axis, a rotor comprising a blade and a universal joint comprising a first joint member, a first pivot connection device pivotally mounting said first joint member relative to said rotary member, a second joint member, a second pivot connection device pivotally mounting said second joint member relative to said first joint member and having its pivot axis generally transverse to the axis of said first pivot connection device, said rotor blade being mounted to extend from said second joint member generally in longitudinal alignment with the axis of said second pivot connection device, inertia means rotatable about an axis generally parallel to said upright axis, means mounting said inertia means upon said body for universal inclination relative thereto, and displaceable means connecting said inertia means with said blade to rock said blade about a longitudinal axis thereof.

24. In an aircraft, a body, a rotary member mounted on said body for rotation about an upright axis, a universal joint comprising a first joint member, a first pivot connection device pivotally mounting said first joint member relative to said rotary member, a second joint member, a second pivot connection device pivotally mounting said second joint member relative to said first joint member and having its pivot axis generally transverse to the axis of said first pivot connection device, a rotor blade mounted to extend from said second joint member generally in longitudinal alignment with the axis of said second pivot connection device, inertia means rotatable about an axis generally parallel to said upright axis in the same direction as the rotation of said rotary member, means mounting said inertia means upon said body for universal inclination relative thereto, and displaceable means connecting said inertia means with said blade to rock said blade about a longitudinal axis thereof.

25. In an aircraft, a body, a rotary member mounted on said body for rotation about an upright axis, a universal joint comprising a first joint member, a first pivot connection device pivotally mounting said first joint member relative to said rotary member, a second joint member, a second pivot connection device comprising antifriction bearings pivotally mounting said second joint member relative to said first joint member for friction-free rotation about a pivot axis generally transverse to the axis of said first pivot connection device, a rotor blade mounted to extend from said second joint member generally in longitudinal alignment with the axis of said second pivot connection device, inertia means rotatable about an axis generally parallel to said upright axis, means mounting said inertia means upon said body for universal inclination relative thereto, and means connecting said inertia means with said blade to rock said blade about a longitudinal axis thereof.

26. In an aircraft, a body, a rotary member mounted on said body for rotation about an upright axis, a universal joint comprising a first joint member, a first pivot connection device pivotally mounting said first joint member relative to said rotary member, a second joint member, a second pivot connection device comprising anti-friction bearings pivotally mounting said second joint member relative to said first joint member for friction-free rotation about a pivot axis generally transverse to the axis of said first pivot connection device, a rotor blade mounted to extend from said second joint member generally in longitudinal alignment with the axis of said second pivot connection device, inertia means rotatable about an axis generally parallel to said upright axis in the same direction as the rotation of said rotary member, means mounting said inertia means upon said body for universal inclination relative thereto, and means connecting said inertia means with said blade to rock said blade about a longitudinal axis thereof.

ARTHUR MIDDLETON YOUNG.